(12) United States Patent
Von Thal et al.

(10) Patent No.: US 7,409,101 B2
(45) Date of Patent: Aug. 5, 2008

(54) IMAGE ENHANCEMENT FOR AERIAL REFUELING OPERATIONS

(75) Inventors: German Von Thal, Laguna Niguel, CA (US); Gregory A. Roberts, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/937,562

(22) Filed: Nov. 9, 2007

(65) Prior Publication Data

US 2008/0063296 A1 Mar. 13, 2008

Related U.S. Application Data

(62) Division of application No. 10/444,636, filed on May 22, 2003, now Pat. No. 7,315,656.

(51) Int. Cl.
G06K 9/40 (2006.01)
H04N 5/235 (2006.01)
H04N 5/247 (2006.01)

(52) U.S. Cl. ............... 382/254; 348/221.1; 348/364

(58) Field of Classification Search ......... 382/128–132, 382/169, 260, 264, 266, 274; 250/208.1; 348/230.1, 229.1, 222.1, 241
See application file for complete search history.

(56) References Cited

U.S. PATENT DOCUMENTS 4,633,376 A   12/1986   Newman
4,647,975 A * 3/1987   Alston et al. ............. 348/222.1
4,763,861 A   8/1988   Newman
5,012,333 A   4/1991   Lee et al.
5,063,607 A   11/1991   FitzHenry et al.
5,144,442 A * 9/1992   Ginosar et al. ........... 348/222.1
5,493,622 A   2/1996   Tsuchino et al.
5,539,624 A   7/1996   Dougherty
5,573,206 A   11/1996   Ward
5,818,975 A * 10/1998   Goodwin et al. ............ 382/274
5,872,595 A   2/1999   Monahan
5,881,181 A   3/1999   Ito
5,982,424 A   11/1999   Simerly et al.
5,996,939 A   12/1999   Higgs et al.

(Continued)

FOREIGN PATENT DOCUMENTS

EP   0732669 A1   9/1996

OTHER PUBLICATIONS

Bender et al, "Comparison of additive image fusion vs. feature-level image fusion techniques for enhanced night driving", Low-Light-Level and Real-Time Imaging Systems, Components, and Applications, C. Bruce Johnson, Divyendu Sinha, Phillip A. Laplante, Editors, Feb. 2003, pp. 140-151.*

(Continued)

*Primary Examiner*—Andrew W. Johns
*Assistant Examiner*—Andrae S Allison
(74) *Attorney, Agent, or Firm*—Lee & Hayes, PLLC (57) ABSTRACT

Methods and apparatus for digitally enhancing images are disclosed. In one embodiment, a method includes analyzing an acquired image to provide a high sensitive low light image and a low sensitive high light image, and then summing the high sensitive low light image and the low sensitive high light image to create an enhanced image.

17 Claims, 10 Drawing Sheets

$T = \frac{1}{2}$ the display level (typically 128 which is $2^7$), and n is the number of bits of the camera output

U.S. PATENT DOCUMENTS

| | | | |
|---|---|---|---|
| 6,137,533 A | 10/2000 | Azim | |
| 6,252,536 B1 | 6/2001 | Johnson et al. | |
| 6,285,787 B1 | 9/2001 | Kawachi et al. | |
| 6,285,798 B1 | 9/2001 | Lee | |
| 6,330,302 B1 * | 12/2001 | Joosten | 378/98.12 |
| 6,366,367 B1 | 4/2002 | Schreier et al. | |
| 6,546,124 B1 | 4/2003 | Hopple et al. | |
| 6,591,017 B1 | 7/2003 | Fukuhara et al. | |
| 6,677,992 B1 * | 1/2004 | Matsumoto et al. | 348/229.1 |
| 6,754,398 B1 | 6/2004 | Yamada | |
| 6,795,117 B2 * | 9/2004 | Tay | 348/241 |
| 6,927,793 B1 * | 8/2005 | Seitz et al. | 348/230.1 |
| 7,050,094 B2 * | 5/2006 | Krymski | 348/221.1 |
| 7,054,461 B2 * | 5/2006 | Zeller et al. | 382/100 |
| 7,072,524 B1 | 7/2006 | Yamada | |
| 7,076,107 B1 | 7/2006 | Terao | |
| 7,079,178 B2 * | 7/2006 | Hynecek | 348/222.1 |
| 7,079,700 B2 | 7/2006 | Shinbata | |
| 7,133,069 B2 * | 11/2006 | Wallach et al. | 348/218.1 |
| 2002/0159623 A1 | 10/2002 | Shinbata | |
| 2004/0096103 A1 | 5/2004 | Gallagher et al. | |

OTHER PUBLICATIONS

Yu et al, "New Image Enhancement Algorithm for Night Vision", Image Processing, 1999. ICIP 99. Proceedings. 1999 International Conference on Publication Date: 1999, vol. 1, On pp. 201-203 vol. 1.*

Waxman et al, "Solid-State Color Night Vision: Fusion of Low-Light Visible and Thermal Infrared Imagery", Lincoln Laboratory Journal vol. 11, No. 1, 1998☐☐☐☐.*

* cited by examiner

IMAGE ENHANCEMENT FOR AERIAL REFUELING OPERATIONS

CROSS REFERENCE TO RELATED APPLICATIONS

This patent application is a divisional application of co-pending, commonly owned U.S. patent application Ser. No. 10/444,636 entitled "Method and Apparatus for Enhanced Viewing of Aerial Refueling Operations," filed on May 22, 2003, which application is incorporated herein by reference.

FIELD OF THE INVENTION

The present disclosure relates to methods and apparatus for digitally enhancing an image, and more specifically, to methods and apparatus for providing digitally enhanced images of aerial refueling operations.

BACKGROUND OF THE INVENTION

Aerial refueling is commonly employed to increase the range and flight duration of an aircraft. Aerial refueling is typically accomplished by having a tanker aircraft carrying a payload of fuel fly on a specified flight path. A receiving aircraft flies in close proximity to the tanker aircraft, and fuel is transferred from the tanker aircraft to the receiving aircraft via a rearwardly-extending boom. The boom is typically operated by an operator located in the tanker aircraft who maneuvers the boom into temporary engagement with a fuel-receiving port of the receiving aircraft. After a desired quantity of fuel is transferred to the receiving aircraft, the operator disengages the boom from the fuel-receiving port, and the receiving aircraft continues on its designated mission. Known aerial refueling systems include, for example, those systems disclosed by U.S. Pat. No. 5,996,939 issued to Higgs et al., U.S. Pat. No. 5,573,206 issued to Ward, and U.S. Pat. Nos. 4,763,861 and 4,633,376 issued to Newman.

In early aerial refueling systems, the boom operator performed the task of manipulating the boom into the fuel-receiving port by direct observation using the naked eye. In more advanced systems, the boom operator views the boom and receiving aircraft remotely by means of camera(s) positioned on a rearward portion of the tanker aircraft. The camera(s) transmits images to a display or monitor located inside the tanker aircraft, typically in a forward portion of the aircraft.

Although desirable results have been achieved using prior art aerial refueling systems, some drawbacks have been noted. For example, during some operating conditions, aerial refueling operations may be hampered by glints, shadows and glare caused by the sun, atmospheric water vapor, or reflections from aircraft surfaces. These conditions may hamper aerial refueling operations, such as by precluding clear visualization of the fuel-receiving port, and may necessitate a deviation of the tanker aircraft and the receiving aircraft from the planned course into an alternate course that allows the boom operator an improved view of the fuel-receiving receptacle. This may necessitate delays in the refueling process and in the overall mission, resulting in increased demands on the tanker aircraft and the receiving aircraft and their respective crews. Thus, there exists a need for an enhanced viewing system that reduces adverse viewing conditions that may otherwise hamper aerial refueling operations.

SUMMARY OF THE INVENTION

The present invention is directed to methods and apparatus for providing digitally enhanced images, including digitally enhanced images of aerial refueling operations. Apparatus and methods in accordance with the present invention may advantageously increase the effective acuity of a viewing system, and may reduce glare, glint, and undesirable shadows, thereby allowing a viewer to see more detail in a digitally enhanced image than would otherwise be perceptible by the viewer.

In one embodiment, a method of digitally enhancing an acquired image includes analyzing the acquired image to provide a high sensitive low light image and a low sensitive high light image, and then summing the high sensitive low light image and the low sensitive high light image to create an enhanced image.

In another embodiment, an apparatus for performing digitally-enhanced viewing operations includes a camera configured to capture an acquired image and a display device. The apparatus also includes a processing system operatively coupled between the camera and the display device. The processing system being configured to perform an image enhancement method to digitally enhance the acquired image to create a digitally enhanced image. The processing system is also configured to output the digitally enhanced image to the display device. The image enhancement includes analyzing the acquired image to provide a high sensitive low light image and a low sensitive high light image, and then summing the high sensitive low light image and the low sensitive high light image to create an enhanced image.

In an additional embodiment, an aircraft comprises a fuselage and a camera operatively coupled to the fuselage and configured to capture an acquired image. The aircraft also comprises an operator station disposed within the fuselage, the operator station including a display device. The aircraft further comprises a processing system that is at least partially disposed within the fuselage. The processing system is operatively coupled to the camera and to the display device. The processing system being configured to perform an image enhancement method to digitally enhance the acquired image to create a digitally enhanced image. The processing system is also configured to output the digitally enhanced image to the display device. The image enhancement includes analyzing the acquired image to provide a high sensitive low light image and a low sensitive high light image, and then summing the high sensitive low light image and the low sensitive high light image to create an enhanced image.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and apparatus for digitally enhancing an image, and more specifically, to methods and apparatus for providing digitally enhanced images of aerial refueling operations. Many specific details of certain embodiments of the invention are set forth in the following description and in FIGS. 1-11 to provide a thorough understanding of such embodiments. One skilled in the art, however, will understand that the present invention may have additional embodiments, or that the present invention may be practiced without several of the details described in the following description.

Figure 1:
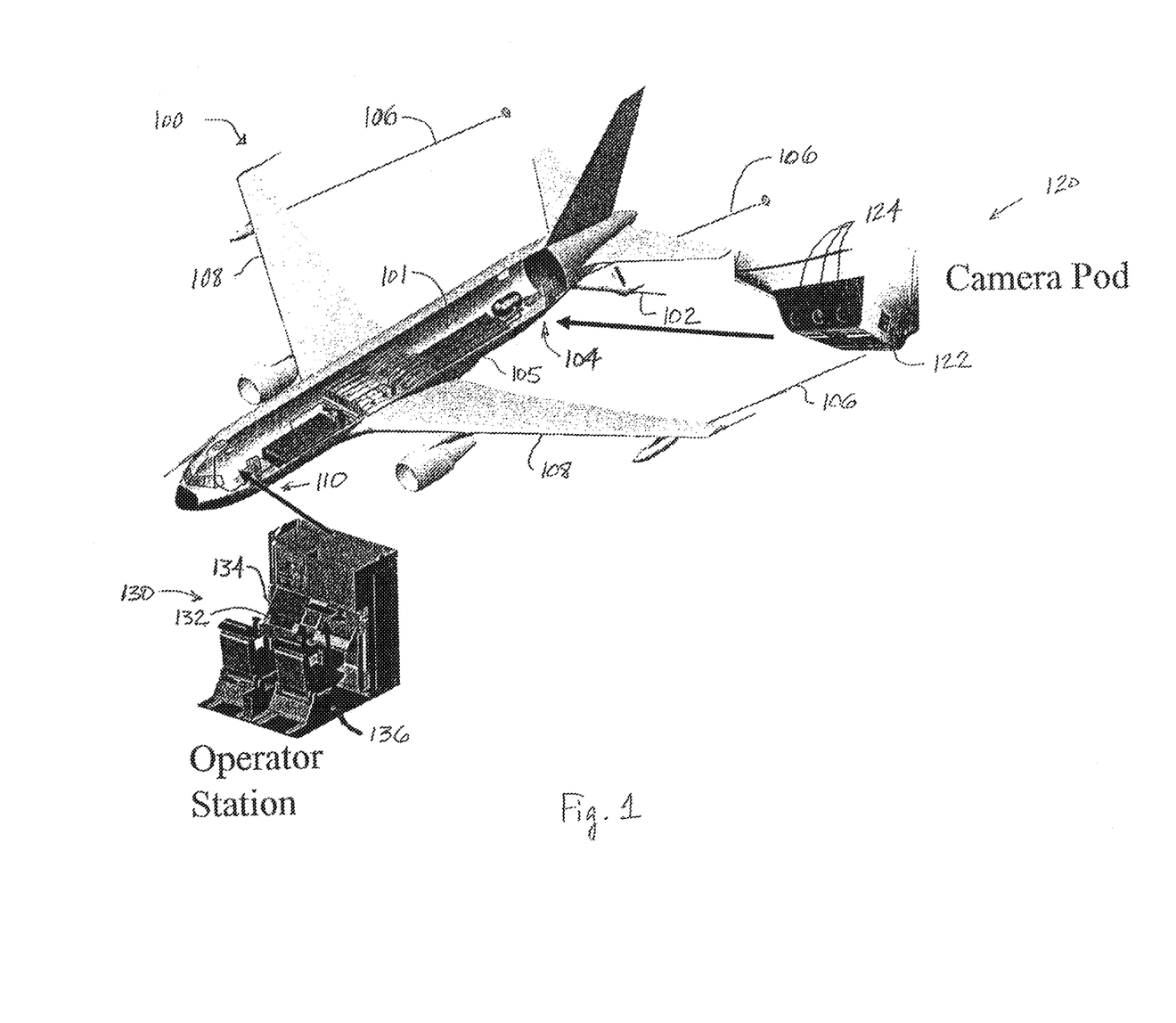
FIG. 1 is a partially-exploded, partially-sectional isometric view of an aircraft having a viewing system in accordance with an embodiment of the invention.

FIG. 1 is a partially-exploded, partially-sectional isometric view of a refueling aircraft 100 having a viewing system 120 in accordance with an embodiment of the invention. The refueling aircraft 100 has an aerial refueling system 101 of conventional design that includes a refueling boom 102 extending from an aft portion 104 of a fuselage 105 of the aircraft 100, and a plurality of hose and drogue refueling systems 106 extending from the wings 108 and aft portion 104 of the refueling aircraft 100. As described more fully below, the viewing system 120 provides improved viewing of a receiving aircraft (not shown) during aerial refueling operations.

In the embodiment shown in FIG. 1, the viewing system 120 includes a camera pod 122 attached to the aft portion 104 of the aircraft 100. One or more cameras 124 are positioned within the camera pod 122. Although FIG. 1 depicts the camera pod 120 in a rotated, forward-looking position in order to show the cameras 124, in the embodiment shown in FIG. 1, the camera pod 120 and cameras 124 are preferably pointed in an aftward-looking direction to permit viewing of the refueling boom 102 and the receiving aircraft as it approaches the refueling aircraft 100 from behind. In alternate embodiments the camera pod 120 may be coupled to the fuselage 105 at any desired location and may be pointed in any desired direction. In still other embodiments, the cameras 124 may be positioned on or within the fuselage 105, and the camera pod 120 may be eliminated.

As further shown in FIG. 1, the viewing system 120 further includes an operator station 130 that may be located in a forward portion 110 of the fuselage 105 of the refueling aircraft 100. In this embodiment, the operator station 130 includes a control panel 132 through which an operator may input commands to the various components of the viewing system 120, and may also permit commands to be input for controlling the refueling system 101. The operator station 130 also includes a display 134 for viewing images, and an image processing system 136 operatively coupled to the display 134 and to the cameras 124. The image processing system 136 includes various electronic components adapted to perform various image-processing operations described more fully below, and may include processors, memory devices, graphics cards, input-output devices, circuitry, and other known electronic components.

Figure 2:
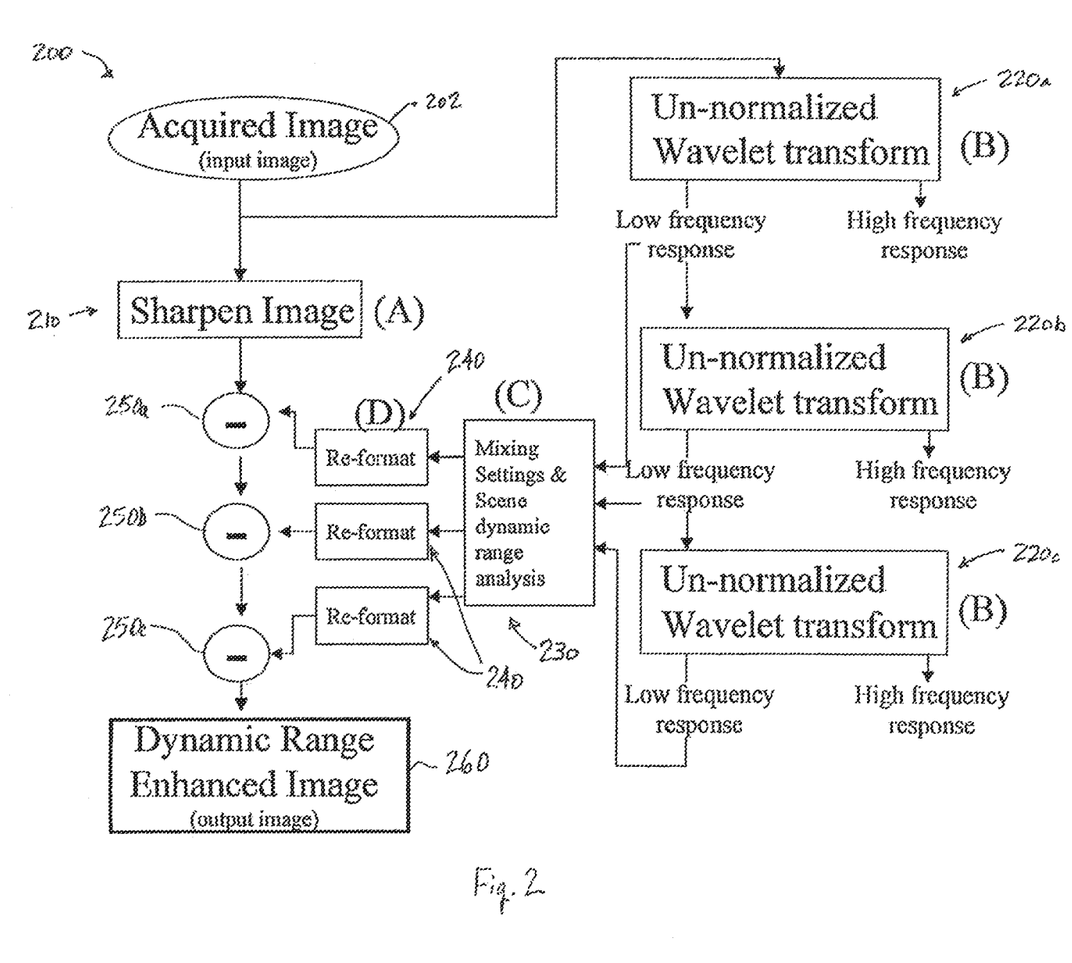
FIG. 2 is a flow diagram of an image enhancement process performed by the viewing system of FIG. 1 in accordance with an embodiment of the invention.
Figure 3:
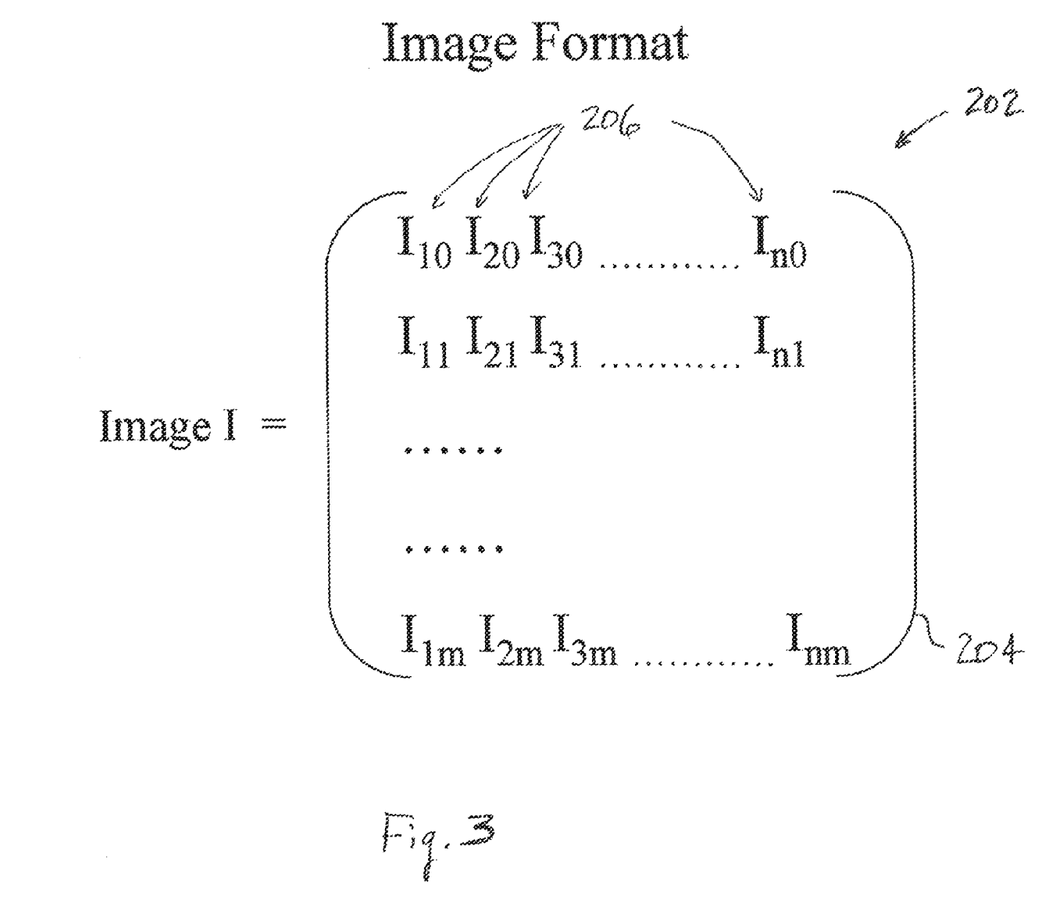
FIG. 3 is a matrix representation of an acquired image of the image enhancement process of FIG. 2 in accordance with an embodiment of the invention.

FIG. 2 is a flow diagram of an image enhancement process 200 performed by the viewing system 120 of FIG. 1 in accordance with an embodiment of the invention. The image enhancement process 200 begins with receipt of an acquired image 202 provided by at least one camera 124. FIG. 3 is a matrix representation of an embodiment of the acquired image 202 of FIG. 2. In this embodiment, the acquired image 202 consists of a two-dimensional matrix 204 of pixel intensities 206, and may be provided by a digital camera 124 having an array of n by m pixels.

As further shown in FIG. 2, the image enhancement process 200 transmits the acquired image 202 to an image-sharpening process 210 and to one or more wavelet transformation processes 220. In the embodiment of the image enhancement process 200 shown in FIG. 2, a total of three wavelet transformation processes 220a, 220b, 220c are successively performed. As further shown in FIG. 2, the output from the wavelet transformation processes 220a, 220b, 220c are transmitted to a mixing and dynamic range analysis process 230. The output from the mixing and dynamic range analysis process 230 then passes through a reformatting process 240. Finally, the output from the reformatting process 240 is then subtracted from the output of the image sharpening process 210 in a subtraction process 250, resulting in a dynamic range enhanced image 260. Each of the steps of the image enhancement process 200 shown in FIG. 2 is described more fully below.

In brief, the image enhancement process 200 may employ local area contrast enhancement techniques to increase the dynamic range of the acquired image 202. More specifically, the wavelet transformation processes 220 may compress the dynamic range of at least some of the spatial frequencies of the acquired image 202, and may expand the dynamic range of a remaining portion of the acquired image 202 back to its original dynamic range. The resulting digitally enhanced image may exhibit improved acuity and reduced obscurity due to glare, glint, and undesirable shadows, and may allow a viewer to see more detail of a desired scene than would otherwise be perceptible by the viewer without digital enhancement.

Figure 4:
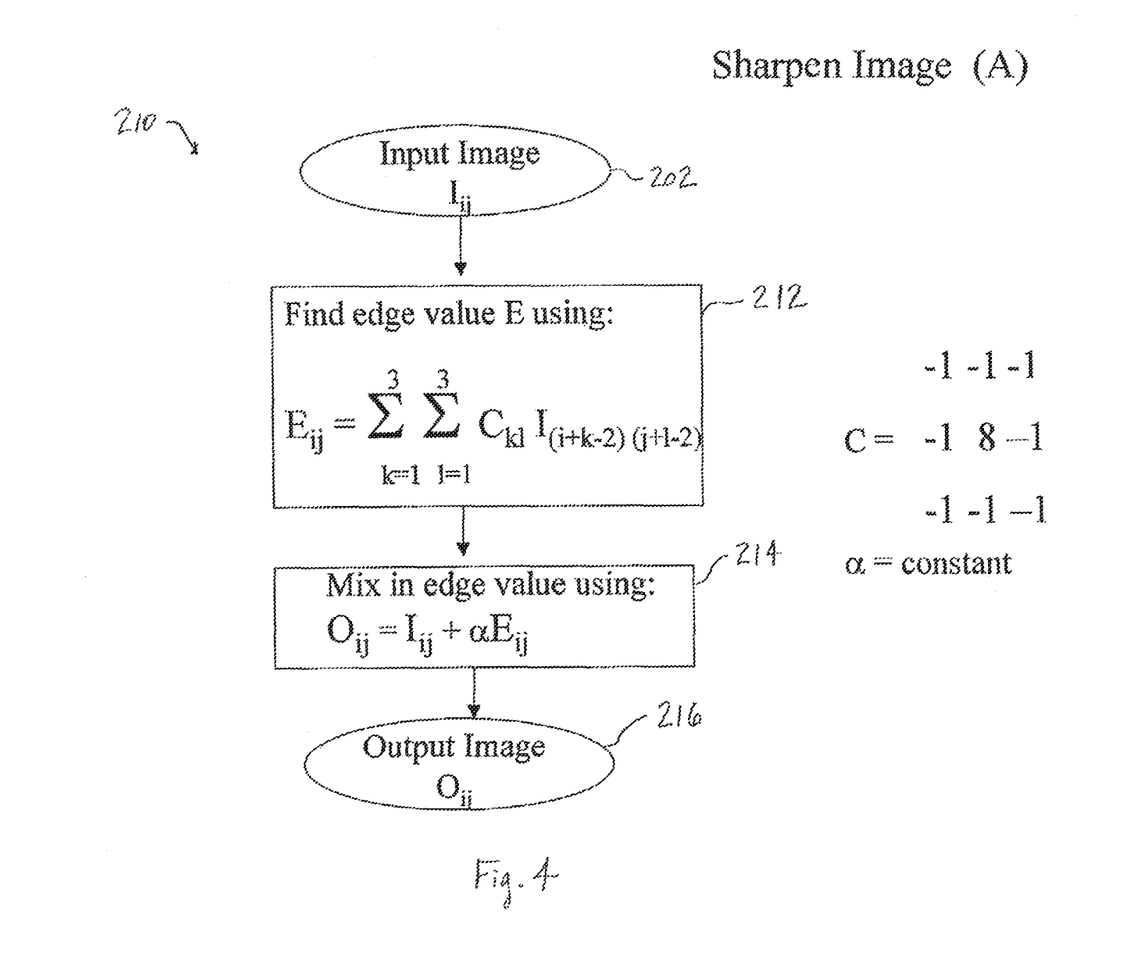
FIG. 4 is a flow diagram of an image sharpening process of the image enhancement process of FIG. 2 in accordance with an embodiment of the invention.

FIG. 4 is a flow diagram of an image-sharpening process 210 of the image enhancement process 200 of FIG. 2 in accordance with an embodiment of the invention. In this embodiment, an edge determination step 212 mathematically analyzes the acquired image 202 (shown as $I_{ij}$ in FIG. 4) to determine an edge value $E_{ij}$ using the equation show in FIG. 4. Unless otherwise noted, the subscripts i, j, k, and l in the equations shown in the accompanying figures represent row and column indices of the pixel intensities that are being analyzed and enhanced. After the edge value $E_{ij}$ is determined, a mixing step 214 is applied to the acquired image 202 according to the equation shown in FIG. 4. Finally, in step 216, a sharpened image $O_{ij}$ is output.

The constant $\alpha$ in the equation for the mixing step 214 shown in FIG. 4 is a sharpening constant proportional to a desired amount of sharpening of the acquired image 202, and may have a value that is dependent upon several parameters, including the camera 124, the display 134, the operator's preference, and other variables of the viewing system 120. In one particular embodiment, the value of the sharpening constant α is equal to one. In alternate embodiments, the value of the sharpening constant α may be greater than one, including a value of two or higher. Generally speaking, a relatively higher value of sharpening constant α may cause undesirable effects within the resulting image (e.g. overshoot), particularly in the vicinity of high contrast edges.

Figure 5:
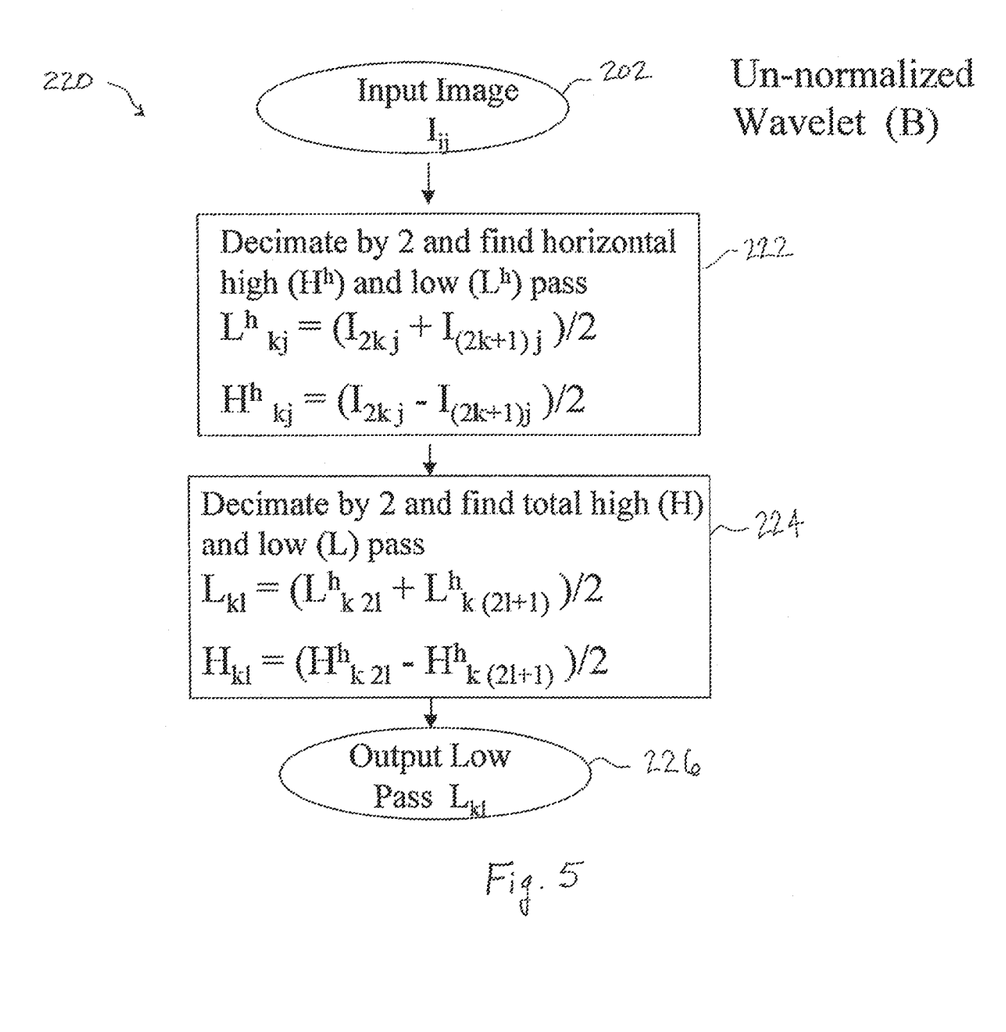
FIG. 5 is a flow diagram of a wavelet transform process of the image enhancement process of FIG. 2 in accordance with an embodiment of the invention.

FIG. 5 is a flow diagram of a wavelet transform process 220 of the image enhancement process 200 of FIG. 2. In this embodiment, the wavelet transform process 220 receives the acquired image 202 (or other input from a previous wavelet transform process), and in step 222, decimates the acquired image 202 by a factor of 2 to create a first decimated image 223. Also in step 222, a horizontal high pass value $H^h_{kj}$ and a horizontal low pass value $L^h_{kj}$ are determined from the first decimated image 223 according to the equations shown in FIG. 5. Similarly, in step 224, the wavelet transform process 220 decimates the first decimated image 223 by a factor of 2 to provide a second decimated image 225, and determines a total high pass value $H_{k1}$ and a total low pass value $L_{k1}$ from the second decimated image 225 according to the equations shown in FIG. 5. The total low pass value $L_{k1}$ is then output by the wavelet transform process in step 226.

As best shown in FIG. 2, the total low pass value $L_{k1}$ of the first wavelet transform process 220a is output to the second wavelet transform process 220b and to the mixing and dynamic range analysis process 230. Similarly, the total low pass value $L_{k1}$ of the second wavelet transform process 220b is output to the third wavelet transform process 220c and to the mixing and dynamic range analysis process 230. Next, the total low pass value $L_{k1}$ of the third wavelet transform process 220c is output to the mixing and dynamic range analysis process 230. The low pass values $L_{k1}$ output by the three wavelet transform processes 220a, 220b, 220c represent three low pass spatial frequencies that provide information that can be further analyzed and processed in order to improve the dynamic range and the functional acuity of the acquired image 202, as described below.

The wavelet transform process 220 shown in FIG. 5 may be a version of a fast wavelet transform process. In a preferred embodiment, the wavelet transform process 220 is a version of a fast wavelet transform process without normalization. In this embodiment, normalization is eliminated because normalization may prevent the low pass image from being subtracted from the original image without the creation of artifacts. It will be appreciated, however, that the wavelet transform process 220 is not limited to the particular embodiment shown in FIG. 5.

Figure 6:
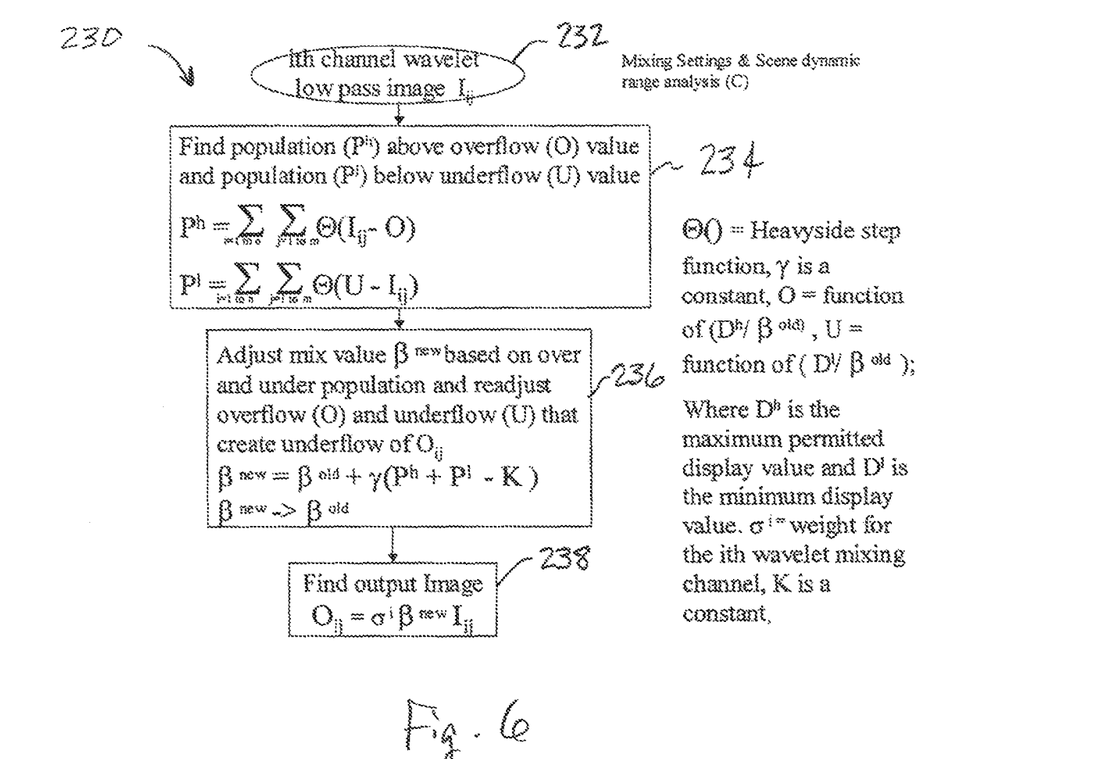
FIG. 6 is a flow diagram of a mixing and dynamic range analysis process of the image enhancement process of FIG. 2 in accordance with an embodiment of the invention.

FIG. 6 is a flow diagram of a mixing and dynamic range analysis process 230 of the image enhancement process 200 of FIG. 2 in accordance with an embodiment of the invention. The mixing and dynamic range analysis process 230 receives each of the three spatial frequencies (the low pass values $L_{k1}$ or "channels") output by the wavelet transform processes 220a, 220b, 220c in step 232. In step 234, the mixing and dynamic range analysis process 230 finds a high population $P^h$ of pixel intensities that are above an overflow value 0, and a low population $P^l$ of pixel intensities that are below an underflow value U according to the equations shown in FIG. 6. The overflow value 0 represents those pixels that are beyond the upper end of the dynamic range that the display 134 can handle. Similarly, the underflow value U represents those pixels that are beyond the lower end of the dynamic range that the display 134 can handle. In one particular embodiment, since conventional computer graphic cards handle 8 bits (256 levels) per color, the overflow value 0 may be initialized based on the image average plus 128, and the underflow value U may be initialized based on the image average minus 128, thereby providing 256 levels based on the 8 bit range. In alternate embodiments, the overflow and underflow values O, U may be initialized differently to provide a different number of levels.

Next, in step 236, the mixing and dynamic range analysis process 230 adjusts a new mixing value $\beta^{new}$ based on the high and low (or over and under) populations $P^h$ and $P^l$, and based on a previous mixing value $\beta^{old}$, according to the equations shown in FIG. 6, and readjusts the overflow O and underflow U values accordingly. The value γ in the equation of step 236 shown in FIG. 6 is a feedback term that is equal to 1/(k number of pixels), where k has a value between zero and one, and is the fraction of image pixels desired to be permitted to under and over saturate multiplied by the number of frames desired for the enhancement calculation to settle. The fraction of image pixels desired to be permitted to under and over saturate, and the number of frames desired for the enhancement calculation to settle, are both pre-determined values based on simple experimentation with the particularities of a given viewing system. Generally, it may be desirable for some pixels to be allowed to over and under saturate to provide improved contrast in the resulting image. It may also be desirable for the enhancement to be adjusted over a relatively greater number of frames to prevent the enhancement from changing unnaturally fast or oscillating with, for example, iris control of the camera 124.

Finally, in step 238, a mixed output image $O_{ij}$ is computed based on the new mixing value $\beta^{new}$ and a weight factor $\sigma^i$ for the $i^{th}$ wavelet mixing channel. The weight factor $\sigma^i$ of step 238 may have a value in the range from zero and one, inclusive, determined by the desired amount of dynamic range for a particular viewing condition. This value may be manually controlled by a control device (e.g. a knob) by the operator located in the operator station 130 (FIG. 1). In one particular embodiment, the weight factor $\sigma^i$ may be controlled by the operator by turning a control knob between a day setting, a dusk setting, a night setting, and a default setting. Generally, the higher the contrast of the particular condition that is being viewed by the viewing system 120, the higher the value of the weight factor $\sigma^i$ that may be desired for the lower spatial frequencies so that these lower spatial frequencies may be subtracted from the acquired image 202, as described more fully below.

The mixing and dynamic range analysis process 230 shown in FIG. 6 preferably provides the mixing values $\beta^{new}$ needed to remove at least some of the over and under saturation of the acquired image 202 that would otherwise occur on the display 134. The mixing values $\beta^{new}$ (and $\beta^{old}$) may be iteratively calculated based on the scene content, preferably in a real-time image processing manner. Furthermore, the iterative mixing and dynamic range analysis process 230 may be a continuously iterative process to account for scene changes, and may settle when the overflow and underflow values O, U become close to the value of K (as shown in FIG. 6), and may thereafter exhibit a dampened oscillation about K.

Figure 7:
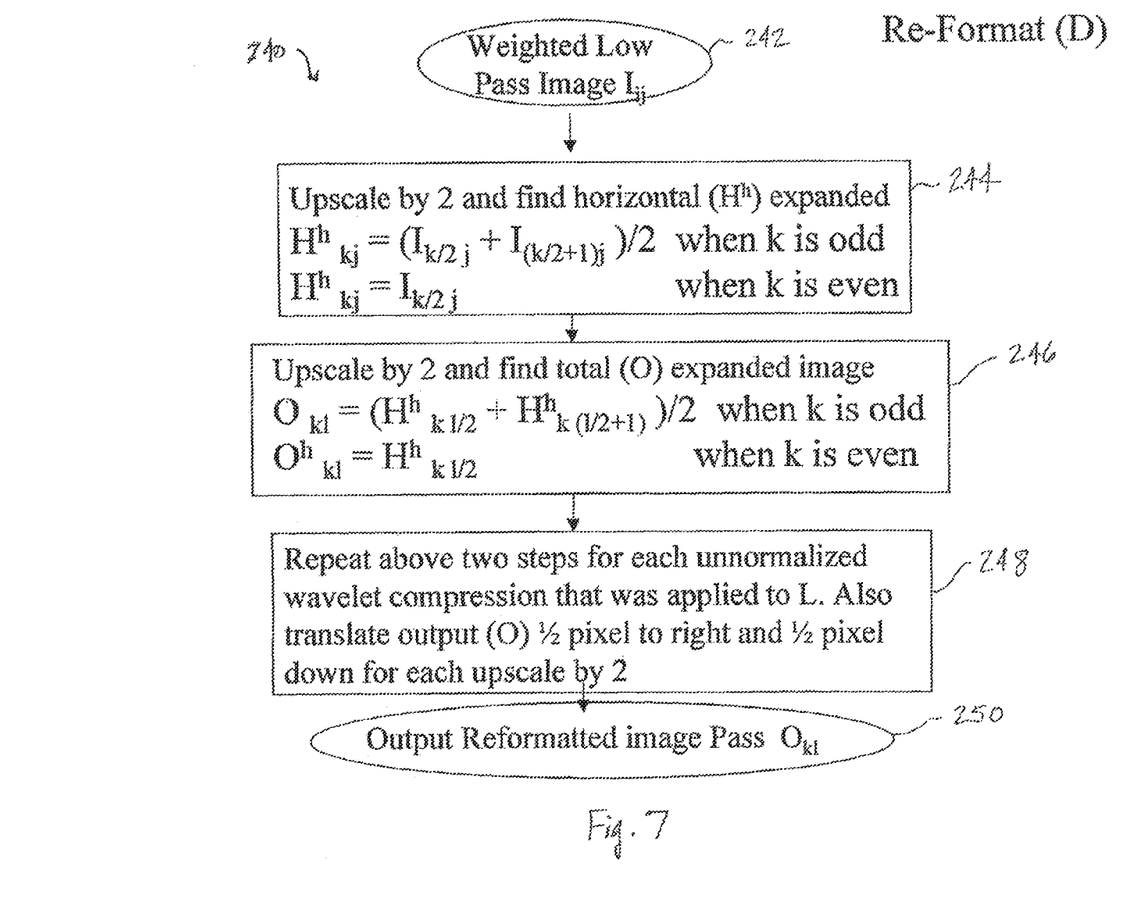
FIG. 7 is a flow diagram of a reformatting process of the image enhancement process of FIG. 2 in accordance with an embodiment of the invention.

As further shown in FIG. 2, the mixed output image $O_{ij}$ for each of the three spatial frequencies (or channels) output by the mixing and dynamic range analysis process 230 is passed to a reformatting process 240. FIG. 7 is a flow diagram of a reformatting process 240 of the image enhancement process 200 of FIG. 2 in accordance with an embodiment of the invention. As shown in FIG. 7, each mixed output image $O_{ij}$ (or weighted low pass image $I_{ij}$) is received in step 242. In step 244, the weighted low pass image $I_{ij}$ is upscaled by 2, and a new horizontal high pass value $H^h_{kj}$ is calculated based on the equations shown in FIG. 7. Next, the weighted low pass image $I_{ij}$ is upscaled by 2, and a total expanded image value $O^h_{k1}$ is calculated based on the equations shown in FIG. 7 in step 246. In step 248, steps 244 and 246 are repeated for each wavelet transform 220 that was applied to the weighted low pass image $I_{ij}$ received in step 242. In addition, in step 248, a translated image is determined by translating the image by ½ pixel to the right and ½ pixel down for each upscale by 2. Finally, the reformatting process 240 outputs a reformatted image $O_{k1}$ in step 250.

The reformatting process 240 may output the reformatted image $O_{k1}$ into the same size image as the sharpened image $O_{ij}$ from the image sharpening process 210. This aspect may allow the reformatted image (or reformatted wavelet image) $O_{k1}$ to be directly subtracted from the sharpened image $O_{ij}$ in an image subtraction process 250 (FIG. 2). In alternate embodiments, either the reformatted image $O_{k1}$ from the reformatting process 240, or the sharpened image $O_{ij}$ from the image sharpening process 210 may be scaled by the image substration process 250 prior to substraction. In still another embodiment, where the image sharpening process 210 is omitted from the method, the reformatted image $O_{k1}$ may be subtracted directly from the acquired image 202. As further shown in FIG. 2, three separate image subtraction processes 250a, 250b, 250c may be performed for each of the three reformatted images $O_{k1}$ corresponding to each of the three spatial frequencies (or channels) resulting from the three wavelet transform processes 220a, 220b, 220c. Finally, the image enhancement process 200 outputs a dynamic range enhanced image 260 to the display 134 of the viewing system 120.

The image enhancement process 200 advantageously digitally enhances the details of the objects shown in the acquired image 202. The image enhancement process 200 increases the effective acuity of the cameras 124. This process also enhances the perceived brightness between intensity steps. Enhancing the contrast of the high spatial frequencies of the image can allow the viewer to see more detail in the image and can lower the amount of time needed for the human to process the detail. In the context of aerial refueling, the dynamic range enhanced image 260 resulting from the image enhancement process 200 provides improved viewing of the details of the fuel receiving port of the receiving aircraft, which are more important for the aerial refueling process than the overall gray level of the aircraft or the background.

Furthermore, the image enhancement process 200 in accordance with the invention may remove high-amplitude, low spatial frequency information, and may enable cameras 124 with dynamic range above 48 db (8 bits) to display their full fidelity dynamic range on a conventional monitor 134. For example, in one embodiment, a 12-bit camera 124 exhibiting approximately 72 db of dynamic range for high spatial frequencies may be successfully employed in a viewing system 120 having a conventional display 134 and a graphics card using only 8 bits (48 db) of information. Thus, the resulting dynamic range enhanced image 260 shown on the display 134 may exhibit improved characteristics, including reduced glare, glint, and undesirable shadows. Thus, the image enhancement process 200 can utilize the effective dynamic range of the camera's signal-to-noise ratio and still display on a conventional monitor.

Image enhancement processes in accordance with the present invention, including the image enhancement process 200, may be implemented using a variety of known software and hardware techniques on any suitable image processing system 136. Typically, the processing required to accomplish image enhancement in accordance with the teachings of the present invention may be relatively more computational and memory intensive than one dimensional signal processing because the data structures (FIG. 3) may be two (or more) dimensional.

Figure 8:
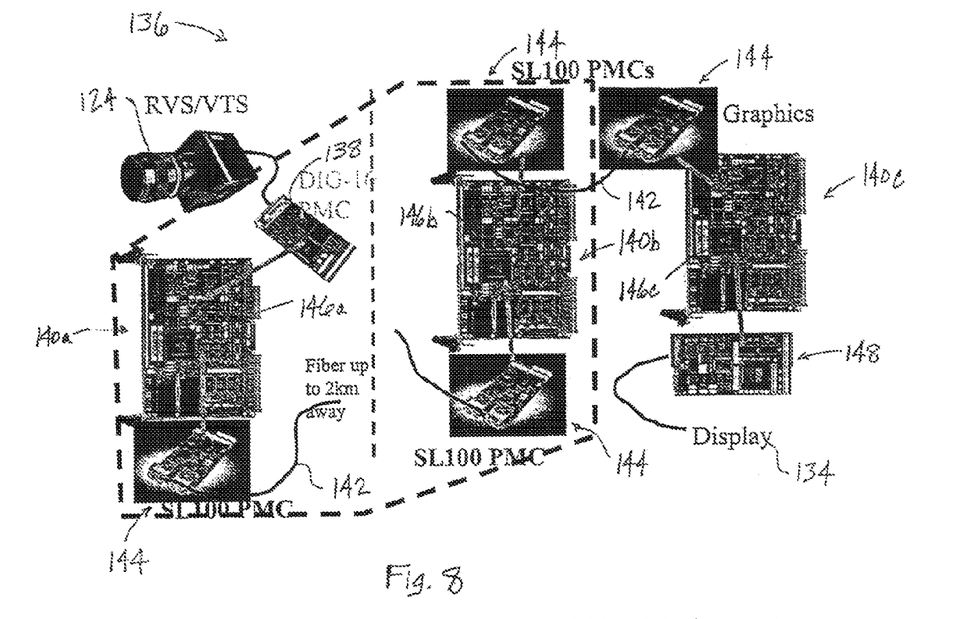
FIG. 8 is a partially-exploded schematic view of an image processing system of the viewing system of FIG. 1 in accordance with an embodiment of the invention.

FIG. 8 is a partially-exploded schematic view of an image processing system 136 of the viewing system 120 of FIG. 1 in accordance with an embodiment of the invention. In this embodiment, the image processing system 136 includes an interface 138 that is operatively coupled to at least one of the cameras 124. The interface 138 may be coupled to the camera 124 by wires, optical fibers, or any other suitable coupling devices. The image processing system 136 further includes a first board 140a (or Circuit Card Assembly (CCA)) coupled to the interface 138, and a second board (or CCA) 140b coupled to the first board 140a via a pair of peripheral component interconnects (PCI) 144 located on the first and second boards 140a, 140b. In one particular embodiment, the interface 138 is a commercially-available 16-bit digital interface PCI mezzanine card (PMC) having a duplexed fiberchannel fiber interface.

The image processing system 136 also includes one or more processors 146. The processors 146 may be any suitable programmable or non-programmable processing devices. For example, in one embodiment, one or more of the processors 146 may be non-programmable Application Specific Integrated Circuits (ASICs). Alternately, at least one of the processors 146 may be a Field Programmable Gate Array (FPGA) having limited programmability. In still further embodiments, one or more of the processors 146 may be general purpose programmable processors and their associated support controllers. The processors 146 may have a relatively large memory bandwidth, efficient cache scheme, and high clock rates. Similarly, the processors 146 may be a Single Instruction Multiple Data (SIMD) parallel processor, and may operate as either a complex instruction set computer (CISC) or a reduced instruction set computer (RISC). Suitable general purpose programmable processors include, for example, the Intel 0x86 (Pentium) and Motorola/IBM Power PC (PPC) lines.

In the embodiment shown in FIG. 8, the image processing system 136 includes a third board 140c coupled to the second board 140b via a pair of PCI interconnects 144. The third board 140c includes a graphics card 148 that, in turn, is coupled to the display 134. In one embodiment, the first and second boards 140a, 140b perform the above-described operations of the image enhancement process 200, and the third board 140c performs operations devoted to the presentation of the dynamic range enhanced image 260 to the display 134 of the viewing system 120.

It will be appreciated that a variety of alternate embodiments of image processing systems 136 may be conceived that will perform image enhancement processes in accordance with the invention, including the image enhancement process 200 described above with reference to FIGS. 1-7, and that the invention is not limited to the particular embodiment shown in FIG. 8. For example, in the embodiment shown in FIG. 8, there are three boards 140a, 140b, 140c, and each of the three boards 140a, 140b, 140c includes a single processor 146. In alternate embodiments, however, the image processing system 136 may include more than three boards (CCA's) 140a, 140b, 140c. In further embodiments, all processors 146 may be located on a single board, or more than one processor 146 may be located on a single board 140, or only one processor 146 may be used in the entire image processing system 136. Furthermore, it may also be noted that the components of the image processing system 136 need not be located entirely within the operator station 136 (FIG. 1), but rather, may be spread between the operator station 130, the camera pod 120, or other suitable locations throughout the aircraft 100.

In one particular embodiment, the image processing system 136 includes six Versa Module European (VME) CCA's 140, each CCA 140 having four Motorola/IBM PPC 7410 processors 146. In this particular embodiment, each PPC 7410 processor 146 operates as a SIMD processor that processes up to 16 pixels in each cycle, allowing the image processing system 136 to process a 12 bit 1K×1K image at a frame rate of 30 Hz. In one particular aspect, the CCA's 140 may be Motorola MVME 5110 VME CCA's that provide for two standard PCI mezzanine card(s) that allow many standard digital and analog interfaces. In yet another aspect, at least some of the boards (CCA's) 140 may be positioned in the camera pod 120, and may acquire data from the camera(s) 124 and send the processed data through one or more optical fibers 142 (FIG. 8) to the operator station 130 for further processing or for direct presentation on the display 134.

Figure 9:
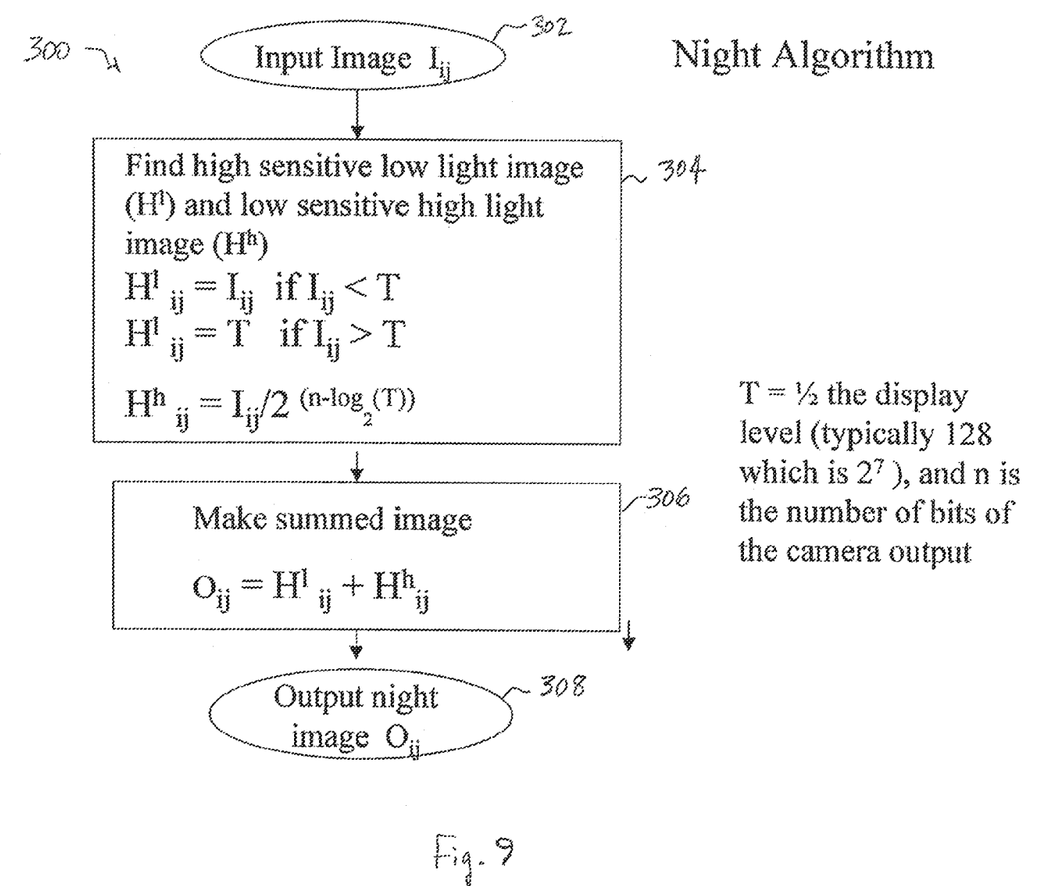
FIG. 9 is a flow diagram of a night image enhancement process performed by the viewing system of FIG. 1 in accordance with an alternate embodiment of the invention.

In an alternate embodiment, the viewing system 120 (FIG. 1) may be operated in a different mode of operation for aerial refueling operations that occur at night or during other low-level lighting conditions. For example, FIG. 9 is a flow diagram of a night image enhancement process 300 performed by the viewing system 120 of FIG. 1 in accordance with yet another embodiment of the invention. As described more fully below, the night image enhancement process 300 may include image fusion to digitally enhance the acquired image 202.

With reference to FIG. 9, the night image enhancement process 300 begins in step 302 by receiving the acquired image 202 provided by the camera 124 (FIG. 1). Next, in step 304, a determination of a high-sensitive low-light image $H^l_{ij}$ and a low-sensitive high-light image $H^h_{ij}$ are performed based on the equations shown in FIG. 9. The high-sensitive low-light image $H^l_{ij}$ and the low-sensitive high-light image $H^h_{ij}$ are then summed in step 306 to form an enhanced night image $O_{ij}$. Through these so-called "image fusion" operations, the process 300 adds the upper camera bits (i.e. the high-sensitive low-light image $H^l_{ij}$) to the lower camera bits (i.e. the low-sensitive high-light image $H^h_{ij}$) to create the enhanced night image $O_{ij}$ that may then have the information of both. Finally, in step 308, the night image enhancement process 300 outputs the enhanced night image $O_{ij}$ to the display 134 (FIG. 1).

The night image enhancement process 300 in accordance with the invention may advantageously provide improvements in the resulting image shown on the display 134 during night or other low-light conditions. Because the night image enhancement process 300 performs "image fusion" by taking information from different ranges and displaying this information together as a single, enhanced image, the resulting enhanced image may exhibit greater detail and higher fidelity than the acquired image 202.

In the specific context of aerial refueling operations conducted at night or other low-light conditions, the night image enhancement process 300 provides improved viewing of such operations. Typically, during night aerial refueling, the receptacle is highly illuminated and has a high contrast and light level, in contrast to the body of the receiving aircraft which is typically dark and weakly illuminated by floodlights. Thus, the lower (relatively more sensitive) camera bits have the aircraft body information, and the upper (relatively less sensitive) camera bits have the receptacle information. Through the "image fusion" steps of the night image enhancement process 300, the enhanced night image $O_{ij}$ resulting from the night image enhancement process 300 features a combination of both, allowing improved viewing of the aerial refueling operations by the operator.

Figure 10:
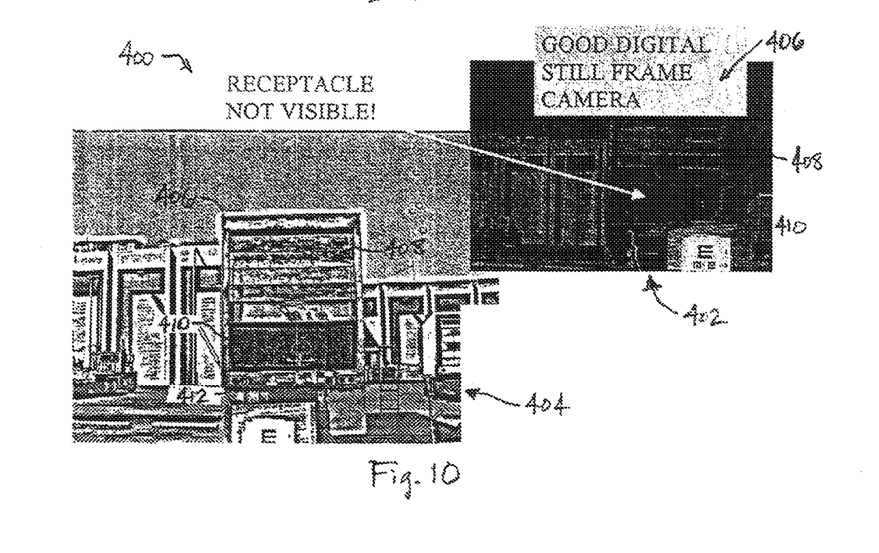
FIG. 10 is a first comparison of an unprocessed image with an enhanced image created by a method in accordance with an embodiment of the invention.
Figure 11:
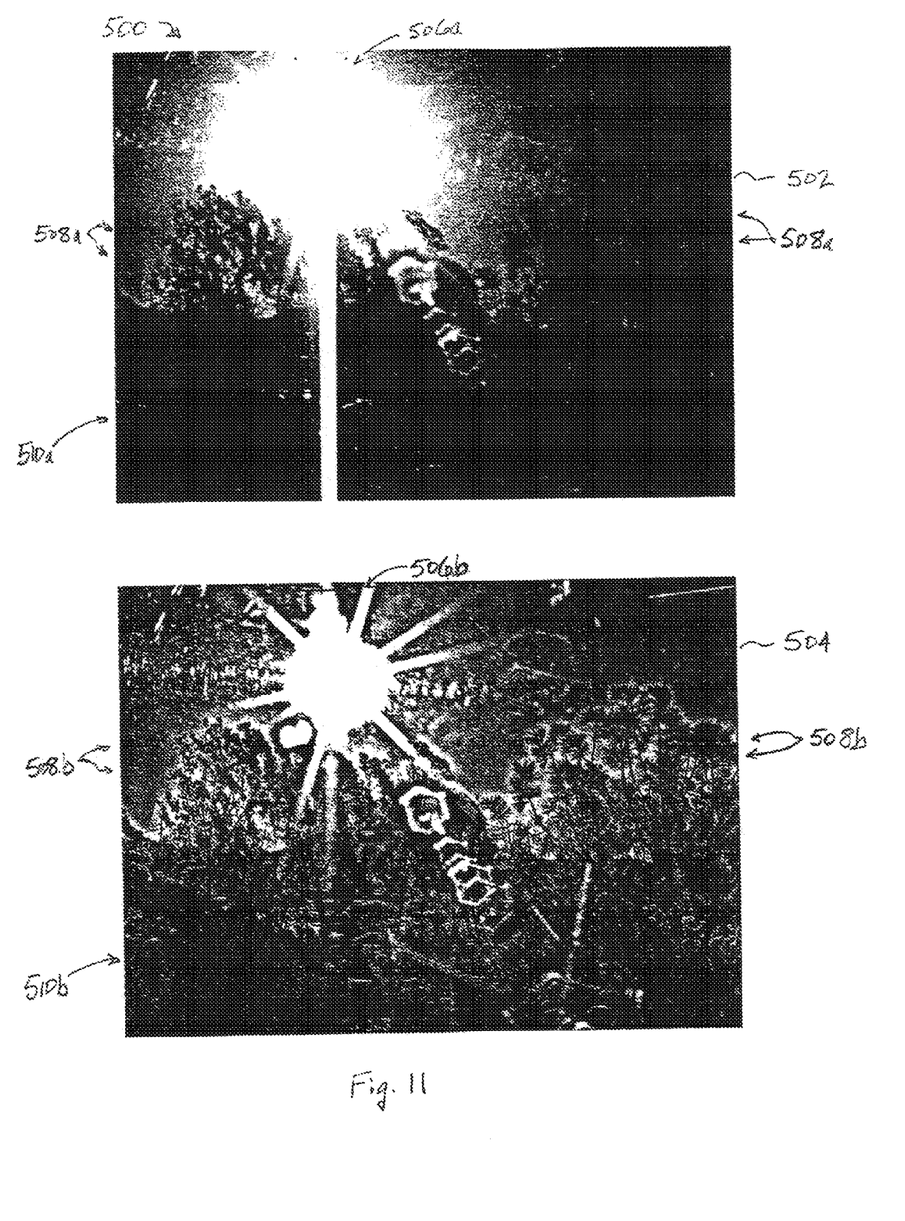
FIG. 11 is a second comparison of an unprocessed landscape image with an enhanced landscape image created by a method in accordance with an embodiment of the invention.

Representative examples of enhanced images provided by the above-described apparatus and methods in accordance with particular embodiments of the invention are shown in FIGS. 10 and 11. FIG. 10 is a first comparison of an unprocessed image 402 with an enhanced image 404 created by an image enhancement method in accordance with an embodiment of the invention. In the unprocessed image 402, a truck 406 is shown having a door 408 positioned in a partially open position. An interior region 410 of the truck 406 is shrouded in darkness (or shadow) with nothing visible. Similarly, the enhanced image 404 shows the truck 406 with the door 408 in the partially open position. In comparison, however, in the enhanced image 404, the interior region 410 is digitally enhanced so that a standard aerial refueling receptacle 412 is clearly visible within the interior region 410. The comparison 400 shown in FIG. 10 provides one example of an improved image that may be provided by viewing apparatus and image enhancement methods in accordance with embodiments of the present invention in the context of aerial refueling operations.

Similarly, FIG. 11 is a second comparison 500 of an unprocessed landscape image 502 with an enhanced landscape image 504 created by an apparatus and method in accordance with an embodiment of the invention. In the unprocessed landscape image 502, a bright sun 506a is shown above a plurality of trees 508a. The unprocessed landscape image 502 also includes a relatively dark foreground area 510a. Similarly, the enhanced landscape image 504 shows an image-enhanced bright sun 506b above a plurality of image-enhanced trees 508b and a foreground area 510b. As may be noted, a greater amount of detail is visible in the image-enhanced trees 508b and the foreground area 510b in the enhanced landscape image 504 compared with the corresponding portions of the unprocessed landscape image 502 in FIG. 11. The comparison 500 shown in FIG. 11 provides yet another example of image enhancement that may be provided by apparatus and methods in accordance with embodiments of the present invention.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A method of digitally enhancing an acquired image, comprising:
    analyzing the acquired image to provide a high sensitive low light image;
    analyzing the acquired image to provide a low sensitive high light image by setting a pixel intensity value of the low sensitive high light image equal to a corresponding pixel intensity value of the acquired image divided by a divisor of two raised to the power of the difference of a first constant minus the logarithm of a second constant; and
    summing the high sensitive low light image and the low sensitive high light image to create an enhanced image.

2. The method of claim 1, wherein analyzing the acquired image to provide a high sensitive low light image includes:
    setting a pixel intensity value of the high sensitive low light image equal to a corresponding pixel intensity value of the acquired image if the corresponding pixel intensity value is less that a predetermined value; and setting the pixel intensity value of the high sensitive low light image equal to the predetermined value if the corresponding pixel intensity value is greater than the predetermined value.

3. The method of claim 2, wherein the predetermined value is equal to one half of a display level on which the enhanced image is to be displayed.

4. The method of claim 2, wherein the predetermined value is equal to one hundred twenty eight.

5. The method of claim 1, wherein the first constant is equal to a number of bits of a camera output of a camera used to acquire the acquired image.

6. The method of claim 1, wherein the second constant is equal to one half of a display level on which the enhanced image is to be displayed.

7. An apparatus for performing digitally-enhanced viewing operations, comprising:
 a camera configured to capture an acquired image;
 a display device; and
 a processing system operatively coupled between the camera and the display device, the processing system being configured to perform an image enhancement method to digitally enhance the acquired image to create a digitally enhanced image, and to output the digitally enhanced image to the display device, wherein the image enhancement method includes:
  analyzing the acquired image to provide a high sensitive low light image;
  analyzing the acquired image to provide a low sensitive high light image by setting a pixel intensity value of the low sensitive high light image equal to a corresponding pixel intensity value of the acquired image divided by a divisor of two raised to the power of the difference of a first constant minus the logarithm of a second constant; and
  summing the high sensitive low light image and the low sensitive high light image to create an enhanced image.

8. The apparatus of claim 7, wherein analyzing the acquired image to provide a high sensitive low light image includes:
 setting a pixel intensity value of the high sensitive low light image equal to a corresponding pixel intensity value of the acquired image if the corresponding pixel intensity value is less that a predetermined value; and
 setting the pixel intensity value of the high sensitive low light image equal to the predetermined value if the corresponding pixel intensity value is greater than the predetermined value.

9. The apparatus of claim 8, wherein the predetermined value is equal to one half of a display level on which the enhanced image is to be displayed.

10. The apparatus of claim 8, wherein the predetermined value is equal to one hundred twenty eight.

11. The apparatus of claim 8, wherein the first constant is equal to a number of bits of a camera output of a camera used to acquire the acquired image.

12. The apparatus of claim 8, wherein the second constant is equal to one half of a display level on which the enhanced image is to be displayed.

13. An aircraft, comprising:
 a fuselage;
 a camera operatively coupled to the fuselage and configured to capture an acquired image;
 an operator station disposed within the fuselage, the operator station including a display device; and
 a processing system at least partially disposed within the fuselage and operatively coupled to the camera and to the display device, the processing system being configured to perform an image enhancement method to digitally enhance the acquired image to create a digitally enhanced image, and to output the digitally enhanced image to the display device, wherein the image enhancement method includes:
  analyzing the acquired image to provide a high sensitive low light image, the analyzing including:
   setting a pixel intensity value of the high sensitive low light image equal to a corresponding pixel intensity value of the acquired image if the corresponding pixel intensity value is less that a predetermined value; and
   setting the pixel intensity value of the high sensitive low light image equal to the predetermined value if the corresponding pixel intensity value is greater than the predetermined value;
  analyzing the acquired image to provide a low sensitive high light image; and
  summing the high sensitive low light image and the low sensitive high light image to create an enhanced image.

14. The aircraft of claim 13, wherein analyzing the acquired image to provide a low sensitive high light image includes setting a pixel intensity value of the low sensitive high light image equal to a corresponding pixel intensity value of the acquired image divided by a divisor of two raised to the power of the difference of a first constant minus the logarithm of a second constant.

15. The aircraft of claim 13, further comprising an aerial refueling system.

16. The aircraft of claim 13, wherein the processing system is operatively coupled to at least one of the camera and the display device by an optical fiber.

17. The aircraft of claim 13, wherein the processing system includes at least one application specific integrated circuit.

* * * * *